United States Patent Office 3,219,991
Patented Nov. 23, 1965

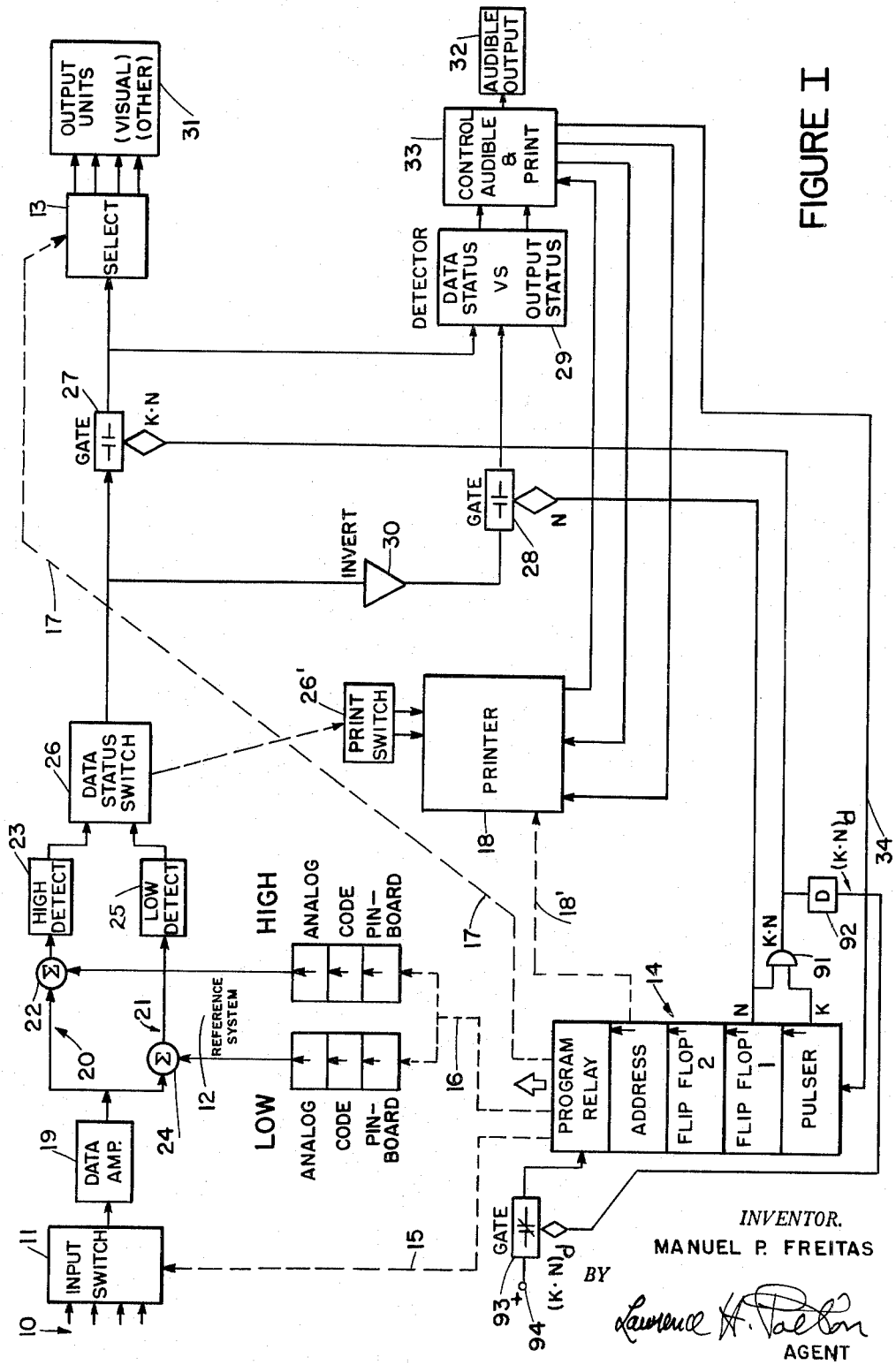
Nov. 23, 1965    M. P. FREITAS    3,219,991
DATA SCANNER MONITORING SYSTEM
Filed June 12, 1963    5 Sheets-Sheet 1
FIGURE I
INVENTOR.
MANUEL P. FREITAS
BY
Lawrence H. Patton
AGENT

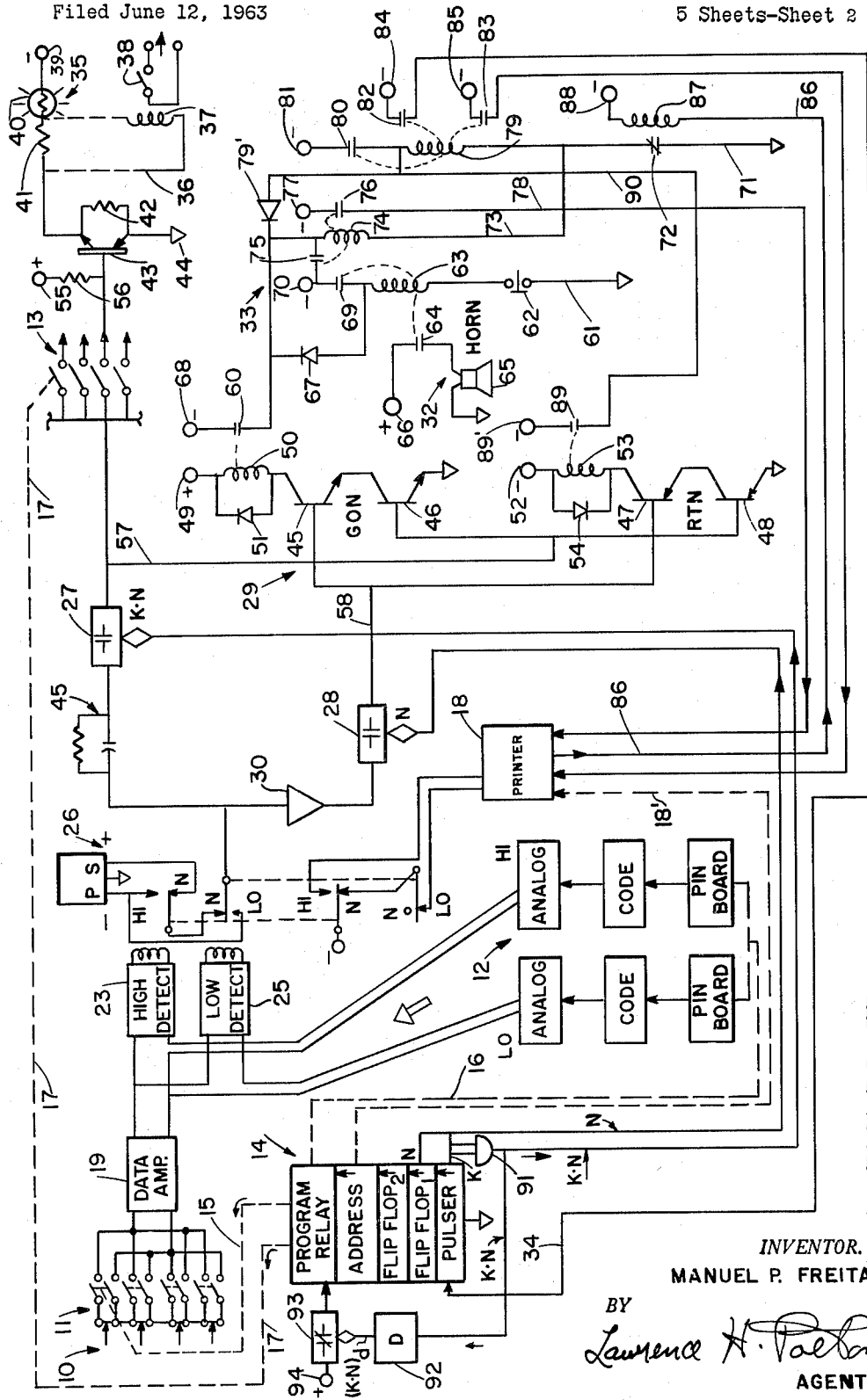
FIGURE II

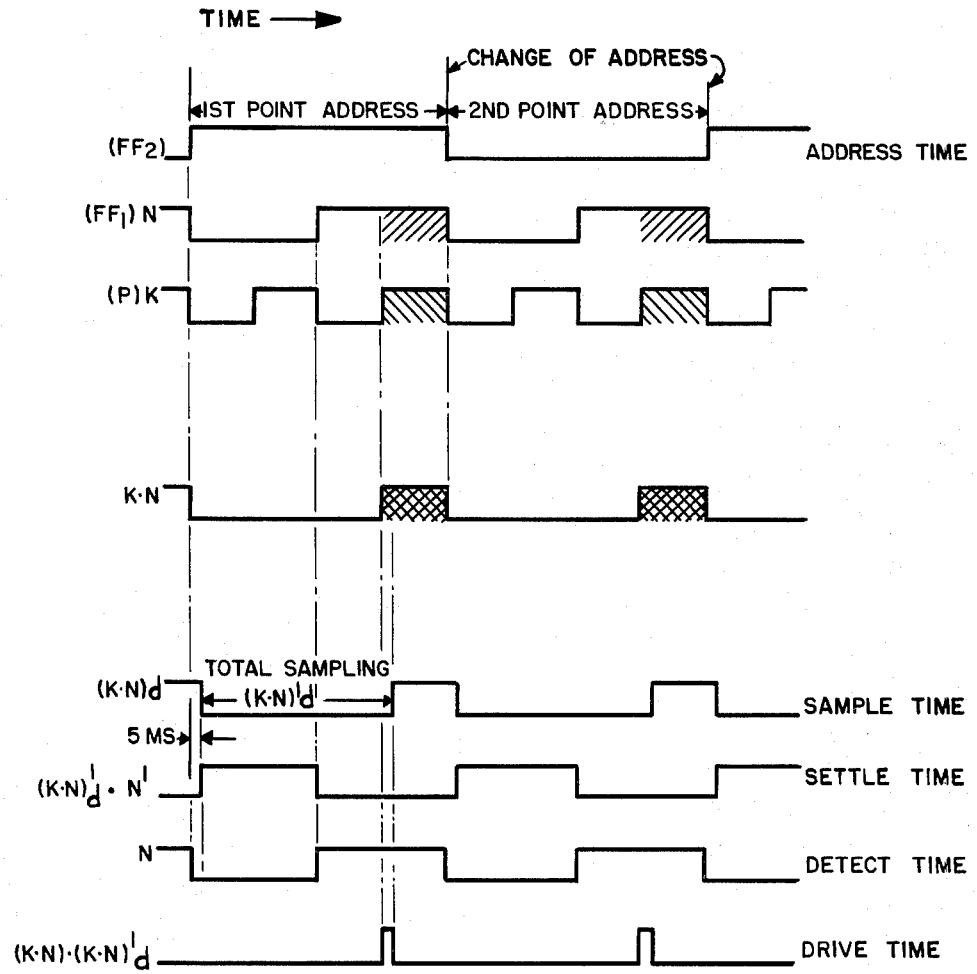
FIGURE III
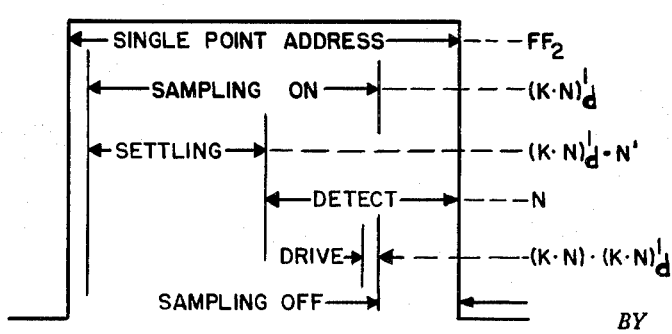
FIGURE IV

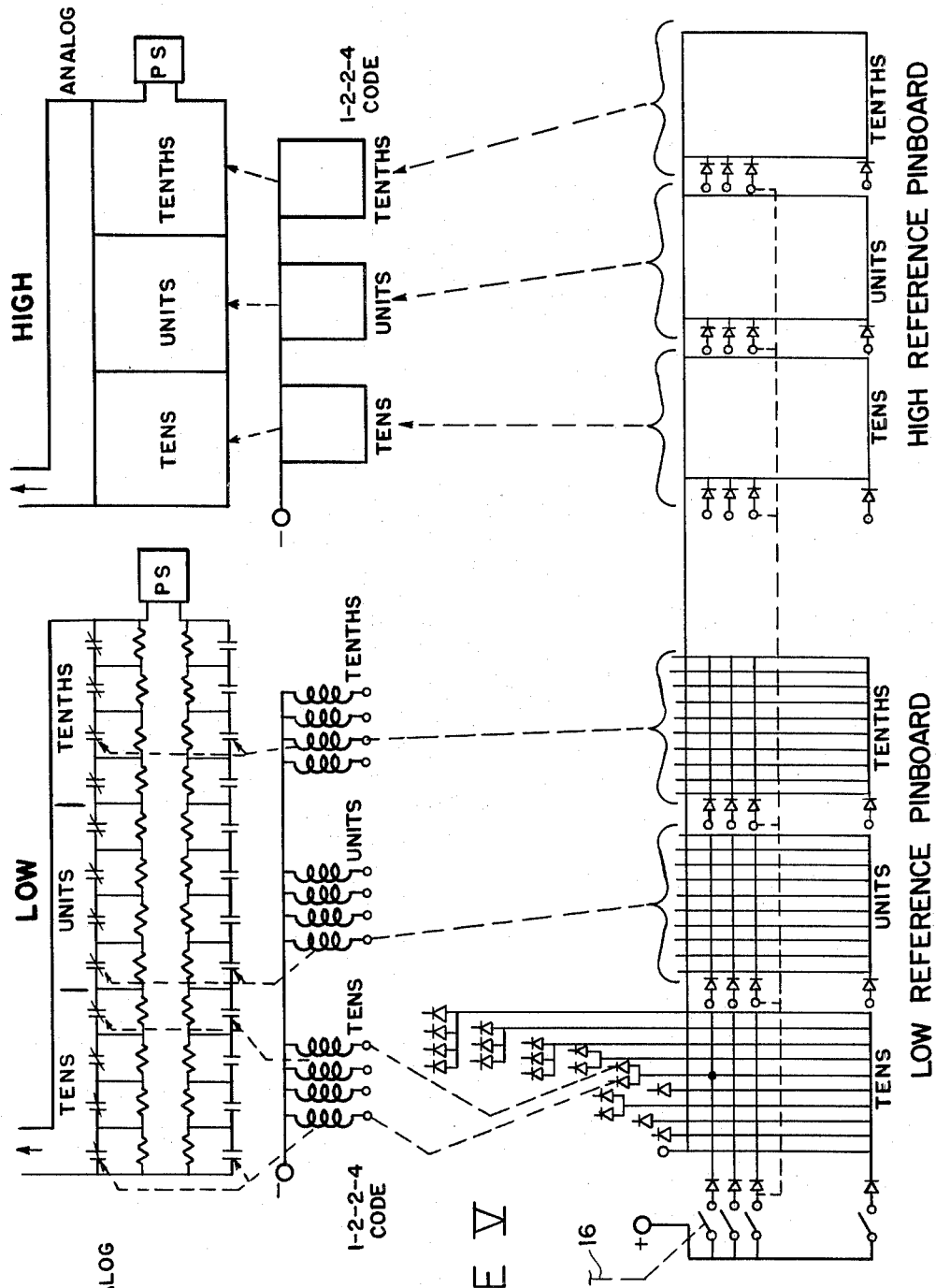

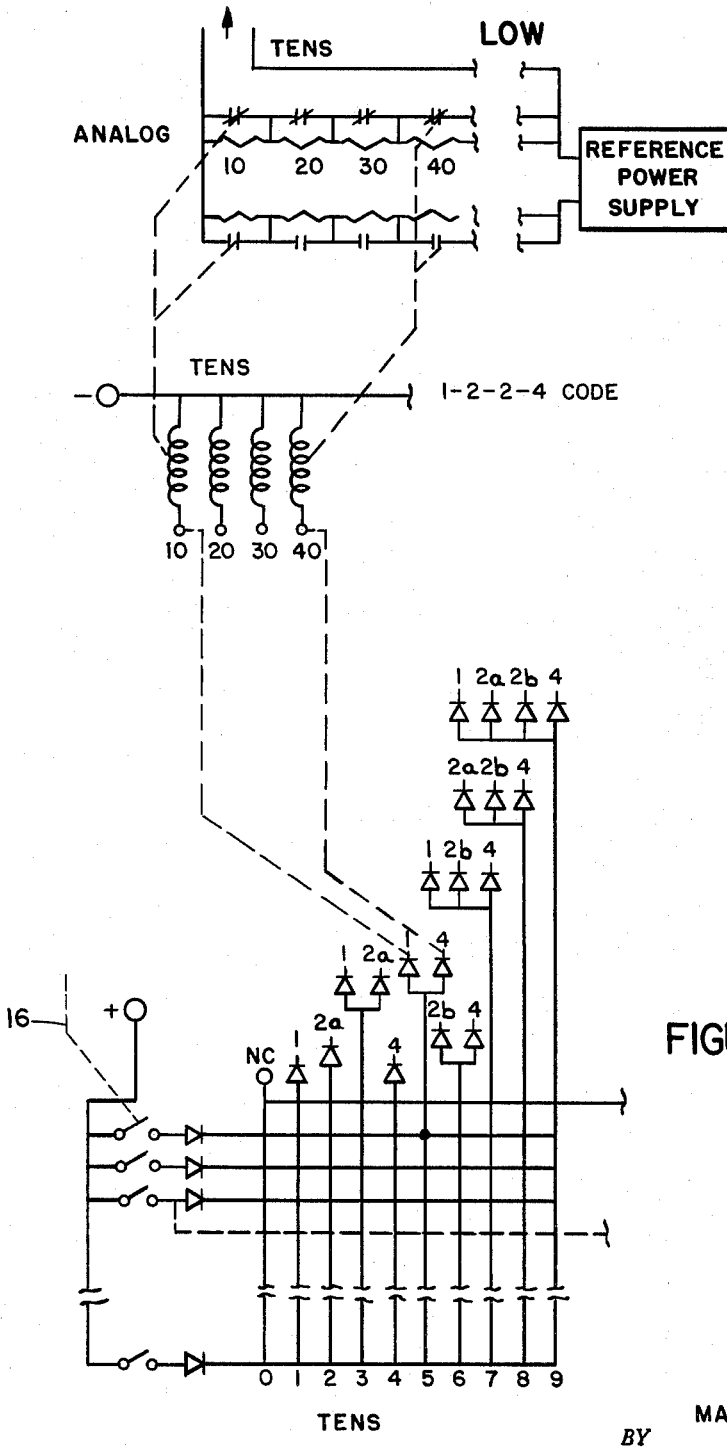
FIGURE VI

3,219,991
DATA SCANNER MONITORING SYSTEM
Manuel P. Freitas, Stoughton, Mass., assignor to The Foxboro Company, Foxboro, Mass., a corporation of Massachusetts
Filed June 12, 1963, Ser. No. 287,349
3 Claims. (Cl. 340—213.2)

This invention relates to industrial instrument systems wherein a number of variable conditions are monitored by scanning to measure automatically and repeatedly to determine whether their values are within predetermined limits, and wherein individual working outputs such as alarms are operated with respect to such measurements.

The present invention is directed to the handling of input signals derived from any variable situation, for example, a combination of a bank of thermocouple temperature signals, and a bank of electrical signals representative of other variables such as flow, pressure, level and the like.

In an iron ore processing situation, in connection with the power plant and its boiler, monitoring is important as to bearing temperatures of motors, turbines, and generators, as to flows of fuel, steam, and water, and as to pressures and levels.

In an instance of this nature, there is a total of 240 such points or situations to be monitored.

It has become increasingly important in systems of this nature to precisely time and control the actions of an annunciator system. This invention therefore provides pulse sequential logic means for this purpose. It operates on a gating basis with respect to the annunciator and a detector associated therewith, and uses solid state means in the detector, and solid state means with memory, in the annunciator.

The present invention thus provides a compact, less expensive and more reliable data monitoring system.

Further, this invention provides a new system of operational control of a data monitoring system, by pulse sequential logic.

Further, this invention provides a detector and annunciator system with a new combination of controls and associate systems based on solid state means, wherein, for example, determinations are made both of signals leaving normal condition and those returning to normal condition.

Also, a print-out system is provided, for establishing a permanent record of the operation of the annunciator system.

An example of this invention provides working output means, for example, a combination of individual visual alarms, a common audible alarm, and common print-out means.

It is an object of this invention to provide a new and useful pulse sequential logic operated data monitoring device.

It is a further object to provide a new and useful pulse sequential logic operated solid state detector and annunciator system.

Other objects and advantages of this invention will be in part apparent and in part pointed out hereinafter and in the drawings, in which:

FIGURE I is a broadly drawn overall system according to this invention;

FIGURE II is a development of FIGURE I in further detail;

FIGURE III is a chart showing of the pulse sequential logic of the system of this invention based on Boolean algebra;

FIGURE IV is an explanatory chart enlargement with respect to the chart of FIGURE III;

FIGURE V is a showing of the reference system within the overall system of FIGURES I and II; and FIGURE VI is an enlargement of a part of FIGURE V.

In FIGURE I, the signal input to this overall system is indicated at the upper left corner of the drawing by arrows 10 which are representative of the individual variable conditions directed to individual input switches in an input switch unit 11. As an example of this input as indicated by the arrows 10, it may consist of a series of D.C. electrical analog signals representing measurements of process variables such as temperature, flow, pressure and the like. Each signal as indicated by each of the arrows 10 is dealt with individually and one at a time on a data scanning, variable condition value monitoring basis.

As each of the input switches in the unit 11 is selected, there is simultaneous, specifically related selection with respect to that particular switch made also in a reference system 12, in an output selector system 13, and in a printer 18. Thus, for a small given period of time, the entire system is devoted to a single one of the variable condition input signals 10. This is done on a repetitive data scanning basis for each of the inputs, momentarily and repeatedly setting up specific individual paths of operation.

The overall system is operated from a pulser system 14 shown at the lower left of the drawing. In series progression this system comprises a pulser unit, a first flip flop unit, a second flip flop unit, an address unit, and a program relay unit. It is from this pulser system that the various portions of the overall system are oriented with respect to each individual signal input as indicated by an input switch selector line 15, a reference system selector line 16, an output selector unit line 17, and a printer selector line 18'.

As will be discussed further hereinafter, in the pulser unit 14, the pulser and the first flip flop unit provide the basis of operation of the pulse sequential logic function of this system.

The reference system 12 is provided with detail showings in FIGURES V and VI. It consists of two series systems in parallel, one for a high reference point and one for a low reference point. Each of these systems is initiated through a pin board wherein the proper value is prearranged and ready for selection. This is led in series into a coding unit known as a 1–2—2–4 code device, as a means of taking off signals from the pin board in a compact simplified manner.

Each of the reference system series units thus continues from the pinboard through the coded system into a converter which transposes the code into an analog form of signal. Thus, the reference system in its overall concept is a digital to analog converter, that is, each of the systems, the low system and the high system, converts a reference signal from a digital situation to an analog situation so that it may be referenced against the output signal from the input unit 11.

Each input signal from its particular input switch in the unit 11 is thereafter applied to a signal data amplifier 19 and the output of the amplifier is simultaneously applied to a high reference signal system 20 and a low reference signal system 21. The high reference system 20 includes a comparator or summer function fancifully indicated at 22, to compare the input signal with the reference signal. This is followed by a high signal detector unit 23.

Similarly, in the low signal reference system there is a comparator summer function fancifully indicated at 24 and followed by a low reference signal detector 25.

Accordingly, an acceptable signal range is set up between high and the low limits derived from the reference system and each of the input signals is individually applied simultaneously to both high and low reference systems to determine whether or not specific signals lie within this acceptable range. If the signal is higher than the high reference, then it appears proper to the low reference and vice versa. In any case, the output of the units 23 and 25 are applied to a data status switch unit 26 and suitable switching action occurs, if called for, to prepare for the operation of the rest of the system in accordance with whether the particular signal is normal, too high, or too low.

A mechanical association of the data status switch 26 is provided in the form of a print switch 26' which is suitably operated in accordance with whether the signal is high or low. This action prepares the printer for proper indication with respect to the status of the incoming signal.

The output through the new data status switch unit 26 is applied simultaneously to two logic gates, one at 27 and one at 28. In the context of this invention, an open logic gate is equated to an open switch in an electrical circuit, and a closed logic gate to a closed switch. Thus, when a gate is open, no signal can pass. The gate 27 leads to the output selector unit 13 where there are individual output units, such as visual or operating units, alarm or otherwise, and the gate 28 leads to a present data status detector-comparator 29 which relates the present status of the output units 31 to the new status from the data status switch 26. In this particular system the signal to the gate 28 is put through a polarity inverter 30.

The gates 27 and 28 are operated on a pulse sequential logic basis from the pulser system 14 as previously indicated. Accordingly, the various output units as at 31, and the detector unit 29 followed by an audible alarm as at 32 are properly sequentially operated. A control unit 33 is provided for audible and printing functions. A scanner cut-off is provided through a feedback 34 to the pulser in the pulser system 14, as a temporary action to allow time for the printer 18 to operate.

In the overall operation of the system of FIGURE I, the pulser system 14 sets up and initiates a single point address situation and a sampling situation wherein a single variable condition is selectively prepared for in the input 11, the output selector 13, the reference system 12 and the printer 18. While in this condition a settling out time is provided wherein gates 27 and 28 remain open, with no information passing through prior to the application of the new information to the output units 31 and to the detector 29. After the settling period is over, gate 28 is closed according to the pulse logic situation from flip flop number 1, and the present data, that is, the data and situation of the present output, is compared with new data just measured in this one single variable condition situation. Suitable action is taken. That is, if it is a going off normal situation (GON), the audible alarm is sounded and the printer is actuated. A brief time later, gate 27 is closed and the visual or other individual output unit such as an alarm unit is actuated according to the status of the new signal.

FIGURES III and IV illustrate this overall operational method and series of steps on a graphical basis.

Referring to FIGURE II, in the upper right hand corner thereof, there is a showing of the visual annunciator of selector unit 13 and one of the annunciators in the form of an alarm light system as at 35. There is one such entire system as at 35 for each of the selector switches in the unit 13.

In this respect, it is possible also to have, either independently of the visual alarm or in conjunction with it, a working output for other forms of alarm or operation as desired. This output is indicated by dotted line 36 to relay 37 for the operation of switch 38 in a working output circuit.

The individual alarm visual unit comprises a minus voltage source 39 with a circuit from there to ground first through a lamp 40, a series resistance 41, and a parallel arrangement of a resistor 42 and a semi-conductor bi-stable switch 43 leading to ground as at 44. The switch 43 may be a 2N1968 germanium semi-conductor device.

The incoming signal pulse from the variable condition, having passed through gate 27 upon actuation by the proper pulse sequential logic function, and through the proper switch in the selector unit 13, will impinge on the semi-conductor switch 43 with a signal which is either plus or minus depending on the status of the measured condition. This signal is derived from a plus or minus voltage power supply for the data status switch 26. The signal from this source is sent through a parallel arrangement 45 of a resistor and condenser to peak the pulse for more efficient operation, and it is this peaked pulse which is applied to the semi-conductor switch 43.

The switch 43 has a memory factor. A minus voltage pulse at its base will activate the switch 43 and make it conductive in the circuit to the lamp. It will remain in this conductive situation due to its bi-stable memory function until a positive voltage pulse is applied to deactivate it and to essentially open the circuit to the lamp 40. The resistor 42, by-passing the switch 43, allows the lamp 40 to stay on, dimly, as a normal condition, to indicate that the lamp is functioning. When an off-normal situation occurs and a minus voltage is applied to the base of switch 43, making it conductive, then the full current goes through the lamp 40 and it burns brightly as an alarm signal. Thus, the switch 43 is activated to close the lamp circuit upon the application of a minus voltage pulse thereto, and to open the lamp circuit upon the application of a plus voltage pulse thereto.

Accordingly, when the status of a particular condition under measurement is normal, then the lamp 40 is dim. If in the course of scanning, this particular condition goes off normal there will be a minus voltage pulse on the base of switch 43 which in effect causes it to conduct and completes the circuit to the lamp 40 so the lamp will then burn brightly.

In a return to normal (RTN) situation, the lamp 40 is first off-normal and burning brightly, and the switch 43 is conducting. The incoming signal now reflects a normal condition and thus is applied to the switch 43 in the form of a plus voltage pulse which deactivates the switch 43, opens the circuit and dims the light 40. Thus, each of the lights 40 will brighten on a GON or going-off-normal situation and will dim on a RTN or return-to-normal situation.

The above actions relate to the alarm lamp and/or possible other output operations through the circuit indicated as at 36, 37, 38; and these occur during a short "drive" period occasioned by closing the gate 27 by applying thereto the suitable pulse sequential logic function in its proper sequence.

At the right end of the FIGURE II, the detector and status comparator system 29 operates in time before the lamp circuit 35 just described. As shown in FIGURE IV, it operates during the detect time, and prior to the drive time. Its function is brought about through the closing of gate 28 by the proper pulse sequential logic function in its proper sequence.

In the system 29 there is an upper section devoted to GON or going off normal situations with transistors 45 and 46 and a lower section devoted to RTN or return to normal situations with transistors 47 and 48. The transistors are different in character according to which signal polarity, plus or minus, will cause the current to flow in which direction. The upper transistors 45 and 46 are known as NPN transistors and the lower ones 47 and 48 are known as PNP transistors. Their various functions will become apparent hereinafter.

In the GON section there is a positive collector voltage source at 49. In the RTN section there is a minus collector voltage source at 52. To make any of these transistors free to conduct, a signal is put on its base so that the signal polarity is in the direction of its collector polarity. The collector of an NPN (GON section) is plus and of a PNP (RTN section) is minus. Each of these two sets of transistors, that is, the GON 45 and 46, and the RTN 47 and 48, are "and" devices. In each set, both must be conductive to operate their whole circuit. To activate either the GON or the RTN circuit, the base of each transistor in that circuit must be of the same polarity as the other and the same as the collector of that circuit.

In a GON situation, the upper circuit including its transistors 45 and 46 will be operated. In a RTN situation, the lower transistors 47 and 48 and their overall circuit will be operated. These two circuits will never be operated at the same time. It will be one or the other depending on the status of the incoming circuit signal and the status of the already present signal previously established in the lamp section 35.

The upper, GON, circuit has a plus voltage power source 49 with a relay coil 50 in series therewith. The GON relay 50 is by-passed by a transient suppressor rectifier 51 and the circuit continues serially through the transistors 45 and 46 to ground. The lower, RTN, circuit is provided with a minus voltage power source at 52 and a relay coil 53 by-passed by a transient suppressor rectifier 54. The lower, RTN, circuit then continues in series through the transistors 47 and 48 to ground.

The first situation to consider is the previous status of the annunciator system in the main, that is, the lamp system 35 as to whether it is on or off (bright or dim) and whether the voltage therefrom is plus or minus. For this purpose, ahead of the lamp system and on the outer side of the selector unit 13 there is a plus voltage source as at 55 leading through a resistor 56 to the lead in to the switch 43. Also the minus voltage source 39 is noted. From these points the circuit may be traced back through the individual selector switch 13 to a lead 57 downwardly from the lamp input and on the outer side of the gate 27, that is, between the gate 27 and the lamp. The lead 57 then proceeds to connect with the lower GON transistor 46 and the lower RTN transistor 48 so that voltage is provided either from the plus source 55 or the minus source 39 and applied to one of the transistors in each of the GON and RTN systems. Thus, both the GON and RTN systems simultaneously have knowledge, in terms of plus or minus voltage applied to both transistors 46 and 48, of the status of the lamp annunciator system prior to the pulse logic closing of the gate 28.

The lead in to the detector and comparator system 29 from the gate 28 is indicated at 58 and is connected both to the GON upper transistor 45 and the RTN upper transistor 47. Thus, when the gate 28 is closed, whatever signal comes through is felt simultaneously in both the GON and the RTN systems. This detector comparator situation thus relates the present status of the annunciator to the status of the incoming signal.

Looking back to the data status switch 26, it will be seen that from a "normal" measurement, a plus voltage will result. From an "off-normal" measurement a minus voltage will result.

If the lamp circuit is normal (dim light) and the new incoming signal is normal, no change occurs.

If the lamp circuit is off-normal (bright light) and the new incoming signal is off-normal, no change occurs.

In the instance where the lamp circuit is normal, the source 55 applies a positive voltage to GON transistor 46 and RTN transistor 47. This is before either gate 27 or gate 28 is closed. On a continuance of normal situation where the output from the data status switch 26 is positive the output of the switch 26 goes through the inverter 30 to properly relate the polarity of the signal to the GON and RTN situations. Thereafter, the signal will proceed through the gate 28 when it is closed by the proper pulse sequential logic function. In this situation, the GON transistor 46 is positive and the incoming signal is positive but is inverted in the inverter 30 to become negative so that the application to the transistor 45 is negative. Thus GON transistors 45 and 46 are of different polarity and that GON circuit is not actuated. That is, the situation is normal and it stays normal.

Considering the same situation with respect to the RTN circuit, the RTN transistor 48 is positive and the incoming signal is first positive and then made negative by the inverter 59 so that a negative signal is applied to the RTN transistor 47. Thus, the RTN system has one negative and one positive transistor and the overall system cannot be actuated. Accordingly, the status quo remains in the annunciator system, with the normal situation of the dim lamp and no other action.

When the lamp circuit is in an off-normal situation, the switch 43 is conducting, the lamp is bright, and the minus voltage from source 39 causes line 57 to become negative in polarity. Hence, GON transistor 46 and RTN transistor 48 become negative. Thus, in a previous off-normal situation, the polarity of the GON and RTN transistors 46 and 48 is negative. When continuing off-normal situation exists and from the data status switch 26 an off-normal situation continues, a negative signal comes through from the switch 26. This negative signal cannot pass through gate 27 which is still open but it is is applied to the inverter 30 and becomes positive and then is passed through the gate 28 and applied to GON transistor 45 and to RTN transistor 47 as a positive signal. Thus the GON circuit is negative at 46 and positive at 45 and the RTN circuit is negative at 48 and positive at 47. Thus both GON and RTN have different polarities within themselves and neither will be actuated. Thus, the continuance of the off-normal situation produces no change in the annunciator.

In the situation where the annunciator is normal and the incoming signal is off-normal the voltage applied from the source 55 to the GON transistor 46 and the RTN transistor 48 is positive. Thus, when the off-normal signal comes in through the data status switch 26 the output of that switch is a negative signal which is inverted to positive in the inverter 59 and applied to GON transistor 45 and RTN transistor 47. In this situation, GON transistors 45 and 46 both receive positive signals which are of the same polarity as the GON collector supply, and the GON circuit is actuated.

Note that in this same situation the RTN transistor 48 is positive and the incoming inverted off-normal signal is positive and applied to the RTN transistor 47. Thus in the RTN situation both transistors are positive but they will not conduct because the nature of these transistors is such that their base signals must be of the same voltage polarities as the collector which, in this case, is in the direction of the negative source 52. Thus in this situation, the RTN circuit part of the detector comparator will not operate.

In the RTN or return to normal situation, the voltage applied to the detector transistors 46 and 48 from the source 39 is negative. In the RTN situation, the signal from the data status switch 26 is normal and therefore positive. It is inverted in the inverter 30 so that it becomes negative as it is applied to GON transistor 45 and RTN transistor 47. Thus in the GON circuit the transistor 46 and the transistor 45 are both negative but the circuit cannot be actuated because they must both be positive according to their collector source 49. However, in the RTN circuit, transistor 48 is negative and transistor 47 is negative and their collector source 52 is negative and therefore the RTN circuit is actuated in this instance.

When the GON circuit is actuated the GON relay coil 50 is actuated to close GON switch 60. Several circuits are established by this closing. One is the circuit indicated through the lead 61 from ground through a manual release spring button switch 62 which is normally closed but with pressure can be opened to break the circuit.

This circuit continues up through a horn actuator coil 63 which closes horn contact 64 to actuate the horn 65, in a circuit from a positive source 66 through the horn to ground. The circuit of the horn actuating coil 63 extends upward through a rectifier 67 and through the closed contact 60 to a negative source 68.

In connection with this horn circuit, there is a holding switch 69 which is also closed by the coil 63 which will complete the circuit to a negative source 70 so that the horn will remain on even when the GON contact 60 is opened. With this situation, the horn remains on until manually cut off by the operator by pressing the manual switch 62.

A further circuit is actuated by the GON closing of contacts 60. From near the bottom of the drawing at the right, a lead from ground as at 71 extends through a normally closed switch 72 which as will be seen hereinafter is used to deactivate these various circuits at a later time. This circuit extends through the switch 72 and upward through a lead 73 to a print out ribbon selector relay coil 74 and through this coil upwards through the closed contact 60 to the negative source 68. The ribbon selector relay coil 74 closes a lock up contact 75 and a ribbon selector contact 76. The ribbon selector coil and this part of the circuit therefore may be held closed and operating through contact 75 leading to negative source 70 even though the GON master contact 60 is deactivated or open.

The ribbon selector contact 76 activates a circuit from a negative source 77 downward through a lead 78 and over to the printer unit 18.

A further circuit activated by the closing of the main GON contact 60 may be traced up from ground also through lead 71 and the cut-off switch 72 upwards to a coil 79 which actuates a holding contact 80 leading to a negative source 81. It also actuates a stop scanner or pulser contact 82 and a contact 83 for initiating print out, from negative sources 84 and 85. The initial circuit here extends through a rectifier 79' to the main GON contacts 60 and source 68.

Note in general, with respect to this entire overall GON situation, that the main GON contact 60 may be broken or opened according to the timing or whatever reason and all of the functions will continue, that is, the horn will continue to blow and the printer ribbon selector will remain, the stop scanner pulser actuation will continue and the initiation of the print out will continue due to the holding contacts as at 69, 75 and 80.

However, this is very quickly done away with since the printer, once it quickly prints whatever the situation calls for, returns a signal along lead 86 to an actuating coil 87 leading to a negative source 88 which causes the contact 72 to momentarily open. It will be seen that the opening of contact 72 breaks all circuitry of the GON situation except for the horn which still maintains its operation until the manual reset button 62 is pressed.

In the RTN situation wherein the RTN actuating coil 53 is energized and the GON coil 50 is not, an RTN main contact 89 is actuated by the coil 53. In this situation, the only energized circuit may be traced from ground up through lead 71 through the normally closed cut-out switch 72, through coil 79 and down through lead 90 to the main RTN contact 89 and its negative source 89'. In this respect, as before, the coil 79, when actuated, closes the holding contact 80 leading to negative source 81 and also closes the stop scanner pulser contact 82 and the print out initiation contact 83.

The pulser is stopped while the printer operates because of the difference in the mechanical and electronic speeds of the device. The overall operation must be halted while this mechanism makes its printing step.

In the RTN situation, the horn does not blow. In this detector comparator RTN situation, the only thing that happens is that there is a print out of the fact that there has been a return to normal.

It should be noted that in the printing action, the ribbon selection as carried out through coil 74 and contact 76 is automatically returned to whatever it was before when the deactivator switch 72 is opened by the printer after its printing action.

Referring to FIGURES III and IV in the light of FIGURES I and II, it can be seen that the pulser operates through four equal time periods with two positive pulses and two negative pulses. This establishes in flip flop 1 a single positive pulse and a single negative pulse in the four time periods. In turn, this establishes in flip flop 2 and the address unit, a single actuated situation in the overall time period established by the four pulser periods which include the two positive pulses and the two negative pulses. In the FIGURE II showing the pulser, when positive, produces a pulse called K, the first flip flop when positive called N. Both the K and the N outputs are applied to an "and" gate as at 91. The flip flop 1 output N in the logic system is directly applied to the gate 28 in its proper time sequence. The pulser logic output K is not applied to anything directly as of itself, but its output through the "and" gate 91 is the Boolean expression $K \cdot N$ (K and N) and this logic function is applied to the gate 27 to actuate the lamp system in its proper sequence.

There is a further $K \cdot N$ action in order to set up the proper sequence and timing of the logic system. In FIGURES I and II, the $K \cdot N$ function is applied to a delay unit 92 to apply $(K \cdot N)_d$ (K and N delayed) to normally closed gate 93 which leads from a positive source 94 to the program relay unit. Thus, the program relay unit is addressed from the pulser and through the flip flop units but the action is delayed according to the $K \cdot N$ delayed logic signal since the relay unit is excited from the source 94. The gate 93 is opened (no signal through) on a logic situation of $(K \cdot N)_d$ and closed on a logic situation of $(K \cdot N)_d'$, i.e., (not $K \cdot N$ delayed).

Thus, according to FIGURE IV the single point address, the output of the flip flop 2 (FF$_2$) unit and the sampling on, is on a logic basis of a "not K and N delayed" $(K \cdot N)_d'$ since the gate 93 is normally closed and the K and N delayed opens it. It takes a $(K \cdot N)_d'$ to close the gate 93 and actuate the program relays and make effective the single point address FF$_2$ situation.

In continuance of the logic through FIGURE IV, once the units have been addressed, and with the sampling actually on to one variable condition pattern, the settling time allows for the progress of the signal through the reference and through the switches so that everything is established in a pattern. In pulse sequential logic this is (not K and N delayed and not N) $(K \cdot N)_d' \cdot N'$. This simply says that gates 27 and 28 are not yet closed.

After the settling time, there is allowed a detect time which is N by itself from flip flop 1 (FF$_1$) as applied to gate 28 to initiate the various actions of the detector comparator system 29 as previously described herein. This is comparing the situation of the previous annunciator situation of normal or off-normal with respect to the incoming signals whether they be normal or off-normal and initiating the various actions with respect to the horn and the printer and the various devices above described except for the light unit.

In the course of the detect time N, having established whatever situation is needed by closing gate 28, gate 27 is now closed through the logic of $K \cdot N$ and a drive situation is established, that is, to apply the new status to the lamp or other function unit by application of a peaked pulse to the switch 43. In FIGURE IV this drive time is indicated as being of very short duration as all that is necessary so that the drive function is, in pulse sequential logic $(K \cdot N) \cdot (K \cdot N)_d'$. The sampling goes off at the end of this drive period, that is, when $(K \cdot N)_d'$ is absent and $K \cdot N$ alone is not enough to continue the drive. It takes a $(K \cdot N)_a'$ to operate the programmer relay gate 93 so the sampling is then off and the detect time and the single point address time continues without effect until the next sampling situation from the pulser as indicated in FIGURE III change of address to second point address.

FIGURES V and VI are details of the reference system as at 12 in FIGURES I and II in which there are two sides of the reference unit, that is, low and high, and each side is addressed through the program relays simultaneously. Each side comprises a series arrangement of a pin board, a 1–2—2–4 code unit, and an analog unit. Both are then summed to the output of the data amplifier 19 of FIGURES I and II. Thus, the input signal from any one variable condition is applied simultaneously to both the high detector and the low detector through their specific reference systems. In each of the reference systems in each of the pin board units from 1 to 9 is codded via diodes in its output so that the 1–2—2–4 code of relays of tens, units and tenths can in a simplified fashion pick off the right digit. For example, in FIGURE V, under the tens, the number 5 is selected and its output is two diodes 1 and 4 which goes to the ten and 40 of the tens section of the 1–2—2–4 code relay unit, with the output of this in turn going to suitable contacts in the analog system. With this arrangement, a simplified system is possible with much less hardware, for example, less relays, than in other situations.

FIGURE VI is an enlarged portion of FIGURE V to illustrate more clearly with numbers the outputs of the pin board. The same illustrative output is shown in this case. The number 5 pickup is 1 and 4 and goes to relays 10 and 40 in the 1–2—2–4 code unit.

Note that in the analog unit there are two parallel situations each in themselves having a series of resistors paralleled with a series of contacts. The lower contacts are normally open and the upper contacts are normally closed. In the example shown, the lower ten normally open contact is closed and the upper ten normally closed contact is opened. Similarly, the lower 40 normally open contact is closed and the upper 40 normally closed contact is opened. The output of the reference power supply is varied according to the by-passing of certain resistances in the lower parallelism between resistors and open contacts. However, it is of considerable advantage to have this situation because of opening the upper contacts the local resistance situation from the reference power supply remains effectively constant regardless of the output of the reference system. That is, when lower contacts are open to by-pass resistances, upper contacts are closed to include these resistances to maintain the local situation as is.

This invention therefore provides a new and improved data monitoring system. As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

1. In a data monitoring device, a combination detector alarm system comprising a first voltage input point-to-ground series circuit including two transistors in series, a data signal input to one of said transistors, a detector voltage input point, a connection from said last named point to the other of said transistors, and an individual alarm system including a third voltage input point, a series circuit from said third input point to ground, said circuit including an alarm unit and a semi-conductor bi-stable switch in series between said input and ground, and means for changing the state of said bi-stable switch to result in a change of state of said alarm unit, said means comprising a voltage input connection to the base of said bi-stable switch on a polarity basis according to signals produced in said device representative of data monitored thereby, said last named connection providing a connection from said third voltage input point to said other of said transistors when said bi-stable switch is in conductive state, whereby said first series circuit is activated whenever both of said series transistors are thus provided with the same preselected polarity.

2. A device as claimed in claim 1 having another similarly connected voltage input point-to-ground circuit with another two transistors in series therein, wherein one of such transistor series functions in terms of GON (going off normal) detection, and the other of such transistor series functions in terms of RTN (return to normal) detection.

3. A device for monitoring a group of variable conditions on the basis of scanning to produce signals related to normal and off-normal status of said conditions, said device comprising, in combination, a reference system for providing values related to said variable conditions, a scanner system for monitoring said variable conditions, a comparator system to which said reference and scanner systems are connected and applied to sequentially determine the status of said variable conditions, a working output system to which the output of said comparator system is connected and applied, including individual signal solid state response means for each of said conditions, said response means including solid state detector and alarm means for identifying and responding to said determined status with respect to the existing status of said output system, and a pulse sequential logic system for operating said detector and output systems whereby said output system is actuated when called for in accordance with said detector identification, said logic system comprising a pulser, a flip-flop operated by said pulser, a logic output from said pulser, a logic output from said flip-flop, an "and" gate to which both of said logic outputs are applied, a switch gate operable directly by one of said logic outputs, and another switch gate operable directly by the output of said "and" gate, said solid state means including an individual alarm system including a voltage input point, a series circuit from said input point to ground, said circuit including an alarm unit and a semi-conductor bi-stable switch in series between said input and ground, and means for changing the state of said bi-stable switch to result in a change of state of said alarm unit, said means comprising a voltage input to the base of said bi-stable switch on a polarity basis according to signals produced in said device representative of data monitored thereby.

References Cited by the Examiner

UNITED STATES PATENTS

| | | | |
|---|---|---|---|
| 2,564,294 | 8/1951 | Belcher | 340—213 |
| 2,774,888 | 12/1956 | Trousdale | 307—88.5 |
| 2,883,255 | 4/1959 | Anderson | 340—213 |
| 2,883,651 | 4/1959 | Akerlund | 340—213 |
| 2,901,739 | 8/1959 | Freitas | 340—213 |
| 3,124,867 | 3/1964 | Foster | 340—213.2 |

FOREIGN PATENTS 766,867   1/1957   Great Britain.

NEIL C. READ, *Primary Examiner.*